(12) United States Patent
Olsen

(10) Patent No.: US 6,969,165 B2
(45) Date of Patent: Nov. 29, 2005

(54) INK RESERVOIRS

(75) Inventor: David N. Olsen, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 46 days.

(21) Appl. No.: 10/373,389

(22) Filed: Feb. 24, 2003

(65) Prior Publication Data

US 2004/0165040 A1 Aug. 26, 2004

(51) Int. Cl.⁷ ............................................. B41J 2/175
(52) U.S. Cl. ...................................................... 347/87
(58) Field of Search ............................. 347/85, 86, 87; 428/315.2; 96/13; 222/524; 604/256; 521/50

(56) References Cited

U.S. PATENT DOCUMENTS

| | | | |
|---|---|---|---|
| 4,771,295 A | | 9/1988 | Baker |
| 5,262,802 A | * | 11/1993 | Karita et al. .................. 347/87 |
| 5,425,478 A | * | 6/1995 | Kotaki et al. ............... 222/501 |
| 5,462,586 A | | 10/1995 | Sugiyama |
| 5,600,358 A | | 2/1997 | Baldwin |
| 5,875,615 A | * | 3/1999 | Ito et al. ....................... 53/474 |
| 5,989,698 A | * | 11/1999 | Mrozinski et al. ....... 428/315.7 |
| 5,992,992 A | | 11/1999 | Gibson |
| 2002/0021340 A1 | | 2/2002 | Olsen |
| 2002/0063759 A1 | | 5/2002 | Hirano |

FOREIGN PATENT DOCUMENTS

| | | |
|---|---|---|
| EP | 1114725 | 7/2001 |
| EP | 1142719 | 10/2001 |
| EP | 1211080 | 6/2002 |
| EP | 1219442 | 7/2002 |

OTHER PUBLICATIONS

Gore Creative Technologies Worlwide, "Venting Products", www.gore.com/separations/venting, copyright 1998, 2000, W. L. Gore & Associates, Inc.
U.S. Appl. No. 10/136,901, Studer, date not available.

* cited by examiner

*Primary Examiner*—Anh T. N. Vo

(57) ABSTRACT

An ink reservoir having a body and a cover disposed on the body is provided. A vent is disposed in the cover. The vent has a vent hole passing through the cover and an elongated vent path that communicatively couples the vent hole to an atmosphere surrounding an exterior of the ink reservoir. An oleophobically treated, porous membrane is disposed over the vent hole for acting to repel ink therefrom and for allowing airflow through the porous membrane and the vent.

35 Claims, 3 Drawing Sheets

INK RESERVOIRS

FIELD OF THE INVENTION

The present invention relates generally to ink reservoirs.

BACKGROUND

Imaging devices, such as printers, facsimile machines, etc., often employ a print head for printing on a printable medium, such as paper. Ink is usually supplied to the print head from an ink reservoir via a flow passage. In one application, the ink reservoir and print head form a single unit, e.g., a print cartridge, and ink flows from the ink reservoir to the print head via the flow passage during printing. In another example, the ink reservoir and print head are separate, and during printing, ink flows from the ink reservoir to the print head via a flexible duct interconnecting the ink reservoir and the print head. Many print heads, such as used in ink-jet devices, include resistors that vaporize the ink supplied to the print head. This causes the ink to be ejected through orifices of the print head so as to print dots of ink on the printable medium.

To prevent ink leakage from the reservoir, it is common to exert a force on the ink to retain the ink within the ink reservoir. For example, many ink reservoirs contain a porous medium, such as foam (or an ink sponge), that is capable of absorbing and retaining ink. The capillarity of the ink sponge exerts a force (capillary force) that draws the ink into the ink sponge, preventing the ink from leaking out of the ink sponge and thus the reservoir. It is also common to use bladders within ink reservoirs for exerting retaining forces on inks.

Many ink reservoirs are vented to atmospheric pressure to prevent excessive vacuum pressures within the reservoir that can reduce or prevent ink flow to the print head. In addition, venting relieves pressure buildups that can occur when an ink reservoir is exposed to extreme environmental conditions, e.g., that can be encountered during shipping, such as high temperatures in motor vehicles or low pressures in airplanes at high altitudes.

Some ink reservoirs use porous membranes for venting. These membranes allow air to flow through the vent while acting to prevent the ink from leaking through the vent. However, the pores of these membranes can become blocked when wetted by ink. Moreover, many recently developed types of ink have reduced surface tensions (and thus better wetting capabilities) for enabling increased ink delivery rates for faster printing. To prevent these inks from wetting the membranes, ink reservoirs are usually under filled, e.g., so that only about 50 to 70 percent of the ink sponge is wetted by ink. Therefore, if the ink expands or the reservoir is over turned, the remaining 30 to 50 percent of the ink sponge will absorb the ink to prevent the ink from contacting the porous membrane. To further prevent these inks from wetting the membranes, the capillarity of the ink sponge is frequently increased for exerting a greater capillary force on the ink to better retain the ink within the ink sponge. One problem with this is that less ink can be extracted from high-capillarity ink sponges than lower-capillarity ink sponges for printing. This means that when ink can no longer be extracted from an ink sponge for printing, there is more undeliverable ink retained (stranded ink) within high-capillarity ink sponges than lower-capillarity ink sponges.

For the reasons stated above, and for other reasons stated below that will become apparent to those skilled in the art upon reading and understanding the present specification, there is a need in the art for alternatives for venting ink reservoirs.

SUMMARY

One embodiment of the present invention provides an ink reservoir having a body and a cover disposed on the body. A vent is disposed in the cover. The vent has a vent hole passing through the cover and an elongated vent path that communicatively couples the vent hole to an atmosphere surrounding an exterior of the ink reservoir. An oleophobically treated, porous membrane is disposed over the vent hole for acting to repel ink therefrom and for allowing airflow through the porous membrane and the vent.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

Figure 1:
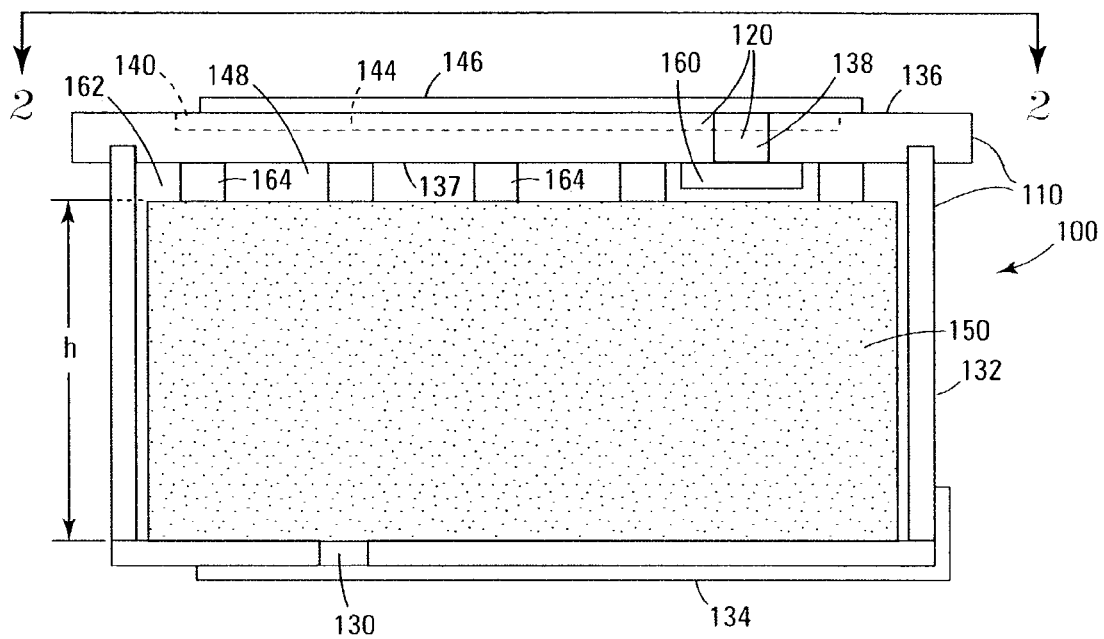
FIG. 1 is a cross-sectional view of an ink reservoir according to an embodiment of the present invention.

FIG. 1 is a cross-sectional view of an ink reservoir 100 according to an embodiment of the present invention. Ink reservoir 100 includes a shell 110 having a vent 120 and an outlet (or interconnect) port 130. Outlet port 130 passes through a body 132 of shell 110. In one embodiment, a seal 134, e.g., a label, tape, or the like affixed to body 132, is disposed over outlet port 130 for closing outlet port 130, for example, when ink reservoir 100 is being shipped, stored prior to usage, etc. Seal 134 is removed for printing.

Figure 2:
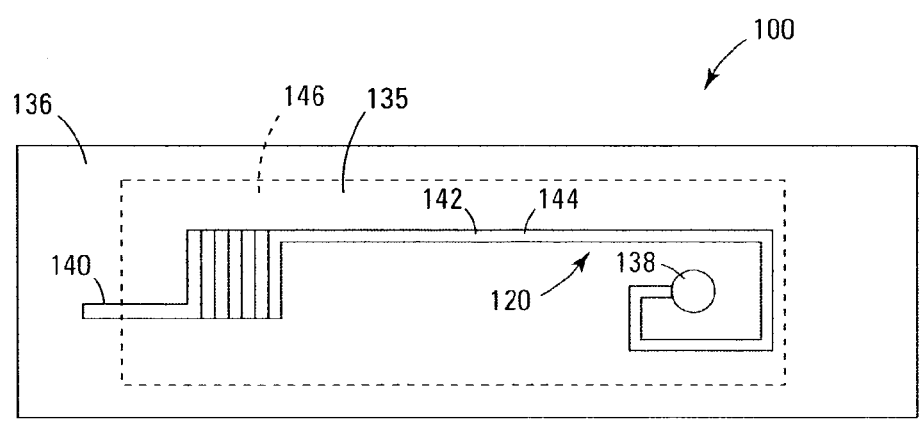
FIG. 2 is a view taken along line 2—2 of FIG. 1.

For one embodiment, vent 120 is disposed in a cover 136 of shell 110, as illustrated in FIG. 1 and FIG. 2, a view of cover 136 taken along line 2—2 of FIG. 1. For some embodiments, vent 120 includes a vent hole 138 passing through cover 136 and a groove 142 in an exterior surface 135 of cover 136 connected to vent hole 138. For one embodiment, groove 142 has a serpentine shape, as shown in FIG. 2. A seal 146 (denoted by dashed lines in FIG. 2) is disposed on cover 136, e.g., a label, tape, or the like affixed to exterior surface 135 of cover 136, so as to close vent hole 138 at exterior surface 135. Seal 146 also closes an open side of groove 142 to form an elongated vent path 144 that is connected to and extends from vent hole 138. However, seal 146 does not cover the entire extent of groove 142, as shown in FIGS. 1 and 2. Rather, a portion 140 of groove 142 remains open to an atmosphere surrounding an exterior of ink reservoir 100. Therefore, vent path 144 communicatively couples vent hole 138 to the atmosphere surrounding the exterior of ink reservoir 100. For one embodiment, vent path 144 has a serpentine shape. For another embodiment, vent hole 138 passes substantially perpendicularly through cover 136 and vent path 144 is substantially perpendicular to vent hole 138, as shown in FIG. 1.

Vent 120 adjusts the pressure within ink reservoir 100 in response to changes in ambient conditions outside of ink reservoir 100, such as changes in ambient pressure and temperature. Vent 120 also allows air to replace ink as the ink is withdrawn from ink reservoir 100 through outlet port 130 during use, without significant evaporation of fluids from the ink.

A porous membrane 160 is disposed over vent hole 138 of vent 120 opposite seal 146 for allowing air to flow through vent hole 138 and thus vent 120 and for acting to repel the ink from membrane 160. Repelling ink from membrane 160 acts to prevent the ink from clogging pores of porous membrane 160 and thus vent 120. The combination of vent path 144 and membrane 160 allows air to flow through vent 120 and acts to prevent ink from leaking through vent 120. For various embodiments, membrane 160 is secured to an interior surface 137 of cover 136 by heat staking, ultra-sonic welding, gluing, or the like.

In one embodiment, membrane 160 is oleophobically treated. For another embodiment, the oleophobic treatment enables membrane 160 to resist wetting by inks (or to repel inks) having surface tensions less than about 30 dynes/cm. For another embodiment, membrane 160 includes an expanded polytetraflouethylene (PTFE) membrane that is oleophobically treated. It will be appreciated by those skilled in the art that oleophobically treating a porous membrane, such as membrane 160, often involves applying a compound having fluoride atoms to the porous membrane, e.g., a compound having a polyfluoroalkyl group, tryfluoromethyl group, perfluoroalkyl group, or the like. Oleophobically treated membranes are available from W. L. Gore & Associates (Newark, Del., USA), Nitto Denko Corporation (Osaka, Japan), and Donaldson Company, Inc. (Minneapolis, Minn., USA).

A porous medium 150 is located in an interior 148 of ink reservoir 100, i.e., within body 132. Porous medium 150 is adapted to contain ink and to act to prevent the ink from leaking through outlet port 130 when seal 134 is removed. In particular, porous medium 150 has a capillarity that exerts a capillary force on the ink that acts to prevent the ink firm leaking through outlet port 130. For various embodiments, porous medium 150 is a hydrophilic capillary material, such as bonded polyester fiber, polyurethane, melamine, or the like.

In one embodiment, a gap 162 separates cover 136 from porous medium 150. In another embodiment, spacers 164 are located within gap 162 and extend between cover 136 and porous medium 150. For one embodiment, spacers 164 are in the form of castellations integral with cover 136. Spacers 164 enable air from vent 120 to move into porous medium 150 to replace ink as the ink is withdrawn from ink reservoir 100 during printing.

Ink reservoir 100 initially contains enough ink to wet porous medium 150, e.g., up to about 75 to 95 percent of its height h. The remainder of porous medium 150 and gap 162 contain air. In one embodiment, the ink has a surface tension of less than or equal to about 30 dynes/cm. During operation, seal 134 removed and ink is withdrawn from ink reservoir 100 through outlet port 130. As the ink is withdrawn, external ambient air enters ink reservoir 100 through vent 120 and membrane 160 to replace the withdrawn ink. Specifically, the air flows through groove portion 140, along cover 136 through vent path 144, through vent hole 138, through pores of membrane 160, and into interior 148 of ink reservoir 100. This acts to prevent excessive vacuum pressures within reservoir 100 that can reduce or prevent ink flow from reservoir 100.

When the ink and air are caused to expand, e.g., when ink reservoir 100 is exposed to sufficiently high temperatures or low pressures, air flows from interior 148 of ink reservoir 100 to outside of ink reservoir 100 through membrane 160 and through vent 120. More specifically, the air flows through the pores of membrane 160, vent-hole 138, vent path 144, and groove portion 140 to the exterior of ink reservoir 100. This acts to reduce the pressure within ink reservoir 100. When the ink expands into gap 162 and encounters membrane 160, membrane 160 repels the ink, thereby preventing the ink from passing through membrane 160. This acts to keep the pores of membrane 160 free of the ink, thus allowing the air to flow through the pores.

Membrane 160 also repels the ink when ink reservoir 100 is oriented so as to cause the ink to encounter membrane 160, e.g., turning reservoir 100 so that membrane 150 is located on a side of or below porous membrane 150. This acts to keep the pores of membrane 160 free of the ink so that air can pass through membrane 160 and thus vent 120 as ink flows from ink reservoir 100.

Figure 3:
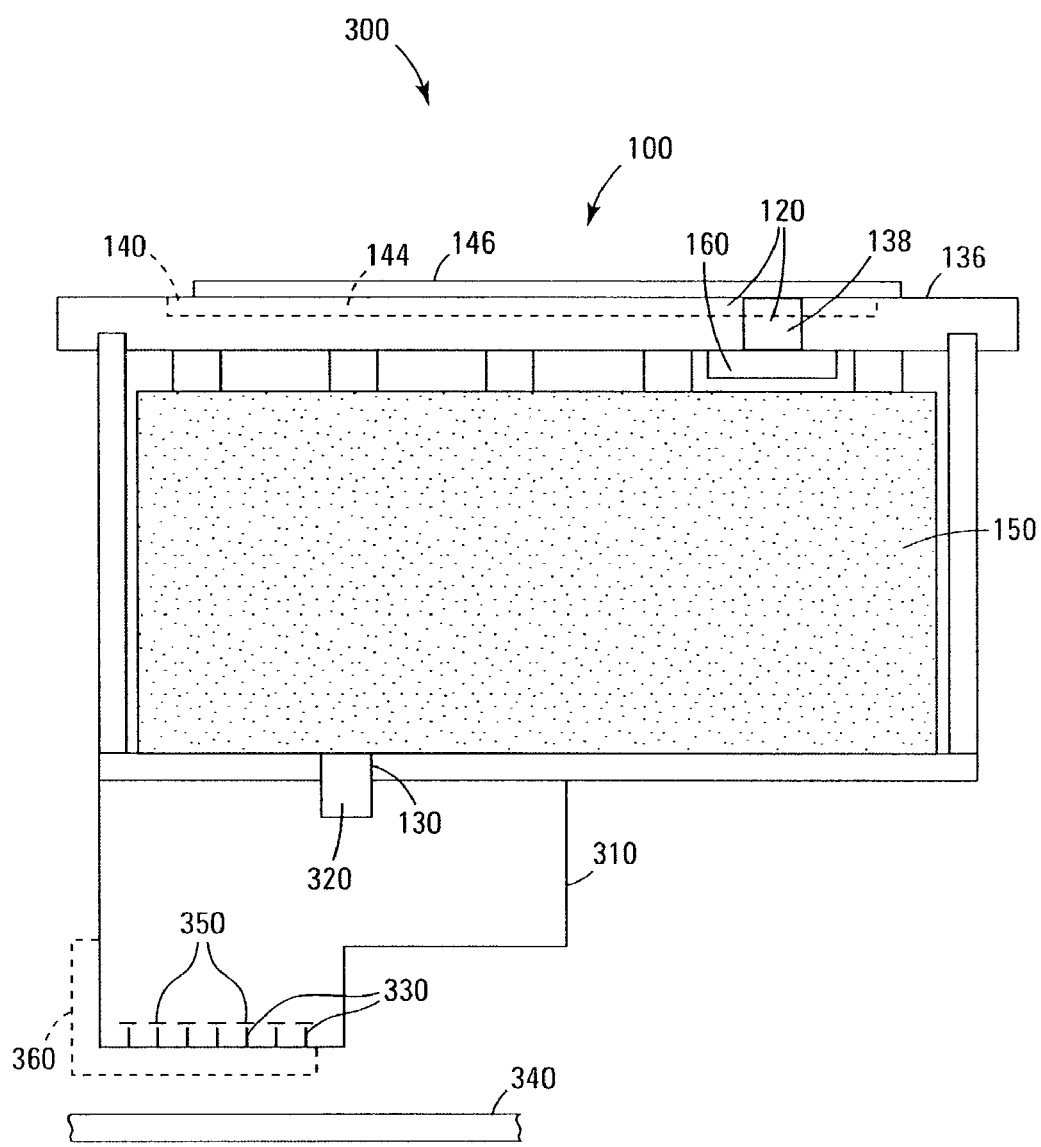
FIG. 3 illustrates a print cartridge according to another embodiment of the present invention.

FIG. 3 illustrates an ink (or print) cartridge 300 according to another embodiment of the present invention. Elements that are common to FIGS. 1 and 3 are numbered as in FIG. 1 and are as described above. Print cartridge 300 includes a print head 310, e.g., an ink-jet print head, that in one embodiment is integral with ink reservoir 100. Print head 310 is fluidly coupled to outlet port 130 of ink reservoir 100 by a flow passage 320. Ink reservoir 100 supplies ink, e.g., ink having a surface tension less than or equal to about 30 dynes/cm, to print head 310 during printing via flow passage 320. Print head 310 includes orifices 330 for expelling the ink supplied to print head 310 for printing on a printable medium 340, e.g., paper, when print cartridge is carried over printable medium 340 by movable carriage (not shown) of an imaging device (not shown), such as a printer, fax machine, or the like. In another embodiment, the capillarity of porous medium 150 exerts a capillary force on the ink that acts to prevent the ink from leaking through outlet port 130 and thus through orifices 330 when print head 310 is not activated for printing.

In another embodiment, the ink is expelled through orifices 330 by vaporizing the ink using resistors 350 located within print head 310. In some embodiments, surfactants are added to the ink to reduce the surface tension to less than or equal to about 30 dynes/cm to increase the rate at which ink reservoir 100 supplies the ink to print head 310 and thus to orifices 330. This acts to increase the frequency at which orifices 330 expel the ink. As ink is expelled through orifices 330, air flows into ink reservoir 100 through vent 120 and membrane 160 to replace the ink expelled through orifices 330. In one embodiment, a seal 360 (indicated by dashed lines), e.g., a label, tape, or the like affixed to print head 310, is disposed over orifices 330 for closing orifices 330, for example, when ink cartridge 300 is being shipped, stored prior to usage, etc. Seal 360 is removed for printing.

Figure 4:
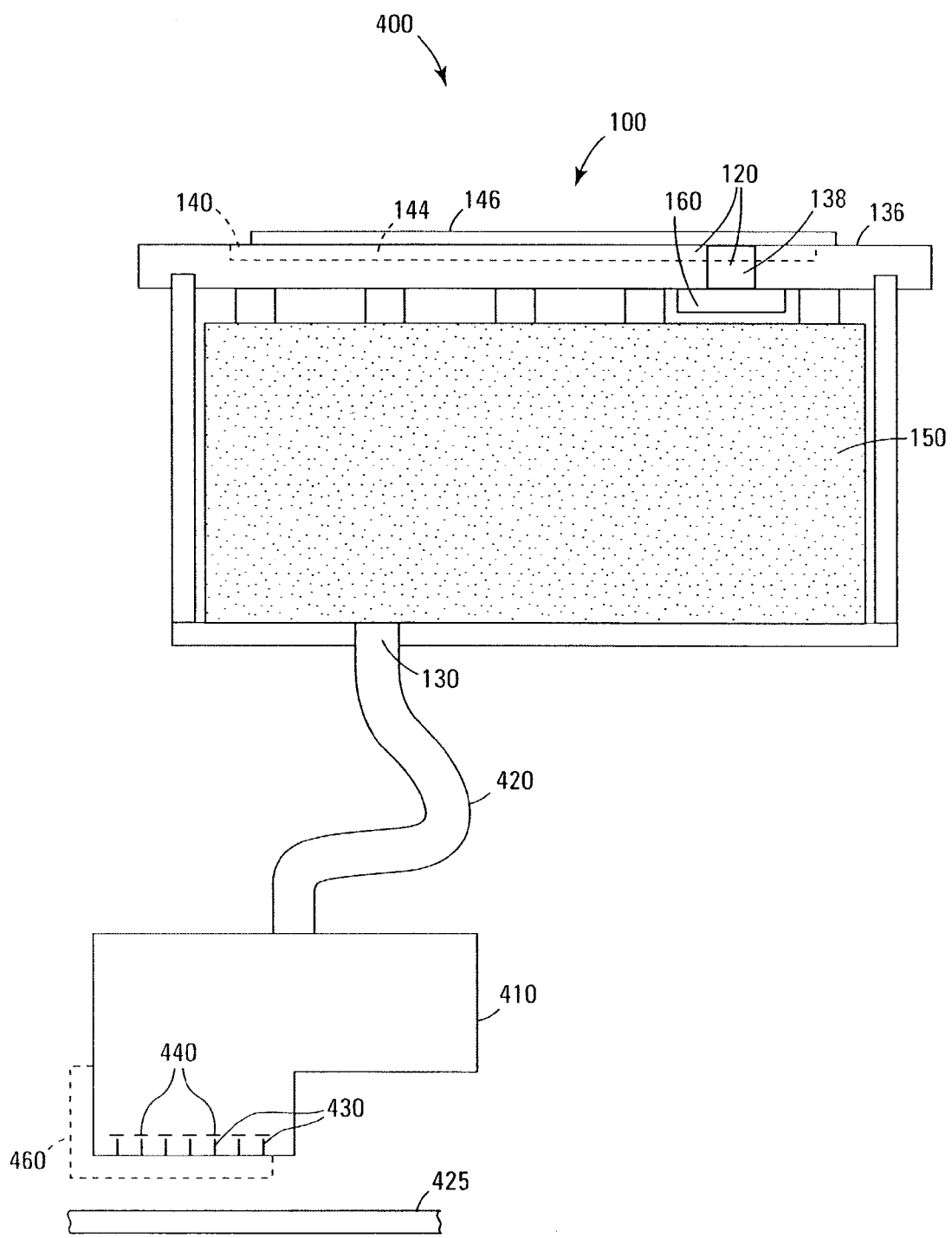
FIG. 4 illustrates an ink deposition system according to another embodiment of the present invention.

FIG. 4 illustrates an ink deposition system 400 according to another embodiment of the present invention. Elements that are common to FIGS. 1 and 4 are numbered as in FIG. 1 and are as described above. Ink deposition system 400 includes a print head 410, e.g., an ink-jet print head, fluidly coupled to outlet port 130 of ink reservoir 100 by a flexible conduit 420, such as plastic or rubber tubing or the like. Ink reservoir 100 supplies ink, e.g., ink having a surface tension less than or equal to about 30 dynes/cm, to print head 410 during printing via conduit 420.

For one embodiment, print head 410 is attached to a movable carriage (not shown) of an imaging device (not shown), such as a printer, fax machine, or the like, while ink reservoir 100 is fixed to the imaging device remotely to print head 410. During printing, print head 410 moves across printable medium 425, such as paper, to deposit images on printable medium 425, while ink reservoir 100 remains stationary. Flexible conduit 420 enables print head 410 to move relative to ink reservoir 100.

Print head 410 includes orifices 430 for expelling the ink supplied to print head 410 for printing on printable medium 425. In one embodiment, the ink is expelled through orifices 430 by vaporizing the ink using resistors 440 located within print head 410. In some embodiments, surfactants are added to the ink to reduce the surface tension to less than or equal to about 30 dynes/cm to increase the rate at which ink reservoir supplies the ink to print head 410 and thus to orifices 430. This acts to increase the frequency at which orifices 430 expel the ink. As ink is expelled through orifices 430, air flows into ink reservoir 100 through vent 120 and membrane 160 to replace the ink expelled through orifices 430. In one embodiment, a seal 460 (indicated by dashed lines), e.g., a label, tape, or the like a affixed to print head 410, is disposed over orifices 430 for closing orifices 430, for example, when ink deposition system 400 is being shipped, stored prior to usage, etc. Seal 460 is removed for printing.

CONCLUSION

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. An ink reservoir comprising:
   a body;
   a cover disposed on the body;
   a vent disposed in the cover, the vent comprising a vent hole passing through the cover and an elongated vent path that communicatively couples the vent hole to an atmosphere surrounding an exterior of the ink reservoir, wherein the elongated vent path remains open to the atmosphere surrounding the exterior of the ink reservoir; and
   an oleophobically treated, porous membrane disposed over the vent hole for acting to repel ink therefrom and for allowing airflow through the porous membrane and the vent.

2. The ink reservoir of claim 1, wherein the porous membrane is adapted to repel ink having a surface tension of less than or equal to about 30 dynes/cm.

3. The ink reservoir of claim 1, further comprising a porous medium located within the body for containing ink and acting to prevent the ink from leaking through an outlet passing through the body.

4. The ink reservoir of claim 1, further comprising a seal disposed over an outlet port passing through the body.

5. The ink reservoir of claim 1, wherein the elongated vent path has a serpentine shape.

6. The ink reservoir of claim 1, wherein the elongated vent path comprises a groove disposed in an exterior surface of the cover covered by a seal.

7. The ink reservoir of claim 6, wherein the seal closes the vent hole opposite the porous membrane.

8. An ink reservoir comprising:
   a body having an outlet port passing therethrough;
   a cover disposed on the body;
   a vent disposed in the cover, the vent comprising a vent hole passing through the cover and an elongated vent path that communicatively couples the vent hole to an atmosphere surrounding an exterior of the ink reservoir, wherein the elongated vent path comprises a groove disposed in an exterior surface of the cover covered by a seal, wherein the seal closes the vent hole at the exterior surface, and wherein a portion of the groove remains open to the atmosphere surrounding the exterior of the ink reservoir;
   a porous medium located within the body for containing ink and acting to prevent the ink from leaking through the outlet port;
   an oleophobically treated, porous membrane disposed over the vent hole opposite the seal for acting to repel the ink therefrom and for allowing airflow through the porous membrane and the vent.

9. The ink reservoir of claim 8, further comprising a seal disposed over the outlet port.

10. The ink reservoir of claim 8, wherein the elongated vent path has a serpentine shape.

11. An ink reservoir comprising:
    means for directing air through a cover of the ink reservoir;
    means disposed in the cover for directing air along the cover between an atmosphere surrounding an exterior of the ink reservoir and the means for directing air through the cover, wherein the means disposed in the cover for directing air along the cover remains open to the atmosphere surrounding the exterior of the ink reservoir; and
    means having an oleophobic treatment and disposed within the ink reservoir and over the means for directing air through the cover for repelling ink contained in the reservoir and for allowing the air to flow between the ink reservoir and the atmosphere via the means for directing air through the cover and the means for directing the air along the cover.

12. The ink reservoir of claim 11, wherein the means for repelling ink contained in the reservoir and for allowing the air to flow between the ink reservoir and the atmosphere is an oleophobically treated, porous membrane.

13. The ink reservoir of claim 11, further comprising means for exerting a capillary force on the ink for preventing the ink from leaking through an outlet port of the ink reservoir.

14. The ink reservoir of claim 11, wherein the means for directing the air along the cover has a serpentine shape.

15. An ink cartridge comprising:
    a print head;
    an ink reservoir fluidly coupled to the print head, the ink reservoir having a vent comprising a vent hole passing through a cover of the ink reservoir and an elongated vent path that communicatively couples the vent hole to an atmosphere surrounding an exterior of the ink cartridge, wherein the elongated vent path remains open to the atmosphere surrounding the exterior of the ink reservoir;

a porous medium located within the ink reservoir for containing ink and acting to prevent the ink from leaking through orifices of the print head; and an oleophobically treated, porous membrane disposed over the vent hole for acting to repel the ink therefrom and for allowing airflow through the porous membrane and the vent.

16. The ink cartridge of claim 15, wherein the porous membrane is adapted to repel ink having a surface tension of less than or equal to about 30 dynes/cm.

17. The ink cartridge of claim 15, further comprising a seal disposed over the orifices of the print head.

18. The ink cartridge of claim 15, wherein the elongated vent path has a serpentine shape.

19. The ink cartridge of claim 15, wherein the elongated vent path comprises a groove disposed in an exterior surface of the cover covered by a seal.

20. The ink cartridge of claim 19, wherein the seal closes the vent hole opposite the porous membrane.

21. An ink deposition system comprising:
a print head;
an ink reservoir fluidly coupled to the print head, the ink reservoir having a vent comprising a vent hole passing through a cover of the ink reservoir and an elongated vent path that communicatively couples the vent hole to an atmosphere surrounding an exterior of the ink reservoir, wherein the elongated vent path remains open to the atmosphere surrounding the exterior of the ink reservoir;
a porous medium located within the ink reservoir for containing ink and acting to prevent the ink from leaking through orifices of the print head; and
an oleophobically treated, porous membrane disposed over the vent hole for acting to repel the ink therefrom and for allowing airflow through the porous membrane and the vent.

22. The ink deposition system of claim 21, wherein the porous membrane is adapted to repel ink having a surface tension of less than or equal to about 30 dynes/cm.

23. The ink deposition system of claim 21, further comprising a seal disposed over the orifices of the print head.

24. The ink deposition system of claim 21, wherein the elongated vent path has a serpentine shape.

25. The ink deposition system of claim 21, wherein the elongated vent path comprises a groove disposed in an exterior surface of the cover covered by a seal.

26. The ink deposition system of claim 25, wherein the seal closes the vent hole opposite the porous membrane.

27. A method for venting an ink reservoir, the method comprising:
passing a vent hole through a cover of the ink reservoir;

disposing an elongated vent path in the cover between an atmosphere surrounding an exterior of the ink reservoir and the vent hole for communicatively coupling the vent hole to the atmosphere;

covering a portion of the elongated vent path with a seal and leaving a remaining portion of the elongated vent path open to the atmosphere surrounding an exterior of the ink reservoir; and disposing an oleophobically treated, porous membrane over the vent hole for repelling the ink from the porous membrane and for allowing airflow between an interior of the ink reservoir and the atmosphere via the porous membrane, the vent hole, and the elongated vent path.

28. The method of claim 27, wherein repelling the ink from the porous membrane comprises repelling an ink having a surface tension of less than or equal to about 30 dynes/cm.

29. The method of claim 27, wherein disposing an elongated vent path in the cover comprises disposing a serpentine elongated vent path in the cover.

30. The method of claim 27, wherein disposing an elongated vent path in the cover comprises forming a groove in an external surface of the cover.

31. The method of claim 27, further comprising covering the vent hole with the seal opposite the porous membrane.

32. A method of dispensing ink, the method comprising:
supplying ink to a print head from an ink reservoir, having a vent comprising a vent hole passing through a cover of the ink reservoir and an elongated vent path, disposed in the cover, that communicatively couples the vent hole to an atmosphere surrounding an exterior of the ink reservoir, wherein the elongated vent path remains open to the atmosphere surrounding the exterior of the ink reservoir;
expelling the ink from print head;
replacing the expelled ink in the ink reservoir with air, wherein the air flows from the atmosphere surrounding the exterior of the ink reservoir through the elongated vent path, through the vent hole, through an oleophobically treated, porous membrane disposed over the vent hole, and into the ink reservoir, wherein the oleophobically treated, porous membrane is adapted to repel the ink therefrom.

33. The method of claim 32, further comprising adding a surfactant to the ink for reducing a surface tension of the ink.

34. The method of claim 33, wherein adding the surfactant to the ink for reducing the surface tension of the ink reduces the surface tension to less than or equal to about 30 dynes/cm.

35. The method of claim 32, further comprising exerting a capillary force on the ink using a porous medium disposed within the ink reservoir.

* * * * *